United States Patent [19]

Durand

[11] Patent Number: 4,587,155

[45] Date of Patent: May 6, 1986

[54] METHOD OF APPLYING A DYE IMAGE TO A PLASTIC MEMBER AND THE IMAGE BEARING MEMBER THEREBY FORMED

[75] Inventor: David Durand, Portsmouth, R.I.

[73] Assignee: Raymond Iannetta, Greenville, R.I. ; a part interest

[21] Appl. No.: 712,117

[22] Filed: Mar. 15, 1985

Related U.S. Application Data

[60] Continuation of Ser. No. 584,818, Feb. 28, 1984, abandoned, which is a division of Ser. No. 377,666, May 12, 1982, abandoned.

[51] Int. Cl.[4] ........................ B32B 5/16; B32B 27/36; D06P 1/16

[52] U.S. Cl. ........................................ 428/195; 8/467; 8/470; 8/506; 8/512; 400/490; 428/207

[58] Field of Search ................... 8/471, 467, 506, 470, 8/512; 428/207, 195; 427/256; 156/244; 400/490

[56] References Cited

U.S. PATENT DOCUMENTS

| | | | |
|---|---|---|---|
| 952,543 | 3/1910 | McClintock | 400/490 |
| 1,148,721 | 8/1915 | Scott | 400/490 |
| 2,350,787 | 6/1944 | Martin et al. | 400/490 X |
| 2,435,130 | 1/1948 | Cunningham | 400/490 X |
| 2,688,579 | 9/1954 | Meyer | 400/490 X |
| 2,947,404 | 8/1960 | Siebels et al. | 400/490 |
| 3,363,557 | 1/1968 | Blake | 8/471 X |
| 3,625,731 | 12/1971 | Taylor | 427/256 |
| 3,666,397 | 5/1972 | Datye et al. | 8/470 |
| 3,860,388 | 1/1975 | Haigh | 8/471 |
| 4,059,471 | 11/1977 | Haigh | 156/244 |
| 4,174,250 | 11/1979 | Durand | 8/471 X |
| 4,202,663 | 5/1980 | Haigh et al. | 8/471 |
| 4,253,838 | 3/1981 | Mizuno et al. | 8/471 |
| 4,264,326 | 4/1981 | Rau | 8/662 |
| 4,271,224 | 6/1981 | Mizvno et al. | 428/207 |
| 4,367,071 | 1/1983 | Mizuno et al. | 8/471 |

FOREIGN PATENT DOCUMENTS

| | | | |
|---|---|---|---|
| 53-60970 | 5/1978 | Japan | 8/470 |

OTHER PUBLICATIONS

English translation, Nippon S., JA53-60970, May 31, 1978, 9 pages.

Brochure-Key-Tech. Inc. "Thermo-Static Keycap Printing TM "-12 pages.

*Primary Examiner*—Thomas J. Herbert
*Attorney, Agent, or Firm*—Cushman, Darby & Cushman

[57] ABSTRACT

A method of applying a dye image to a plastic member and the image bearing member thereby formed. A disperse dye having a melting point which is below the thermal deflection temperature of the plastic of the member and a vaporization point which is above said deflection temperature is applied to a surface of the member in a desired image. The dye bearing plastic is then heated to a temperature which is above the melting point of the dye and below the thermal deflection temperature of the plastic, but which is nevertheless high enough to cause some softening of said plastic. The dye is then permitted to diffuse into the plastic to provide a sharp, clear and durable image thereon.

5 Claims, 7 Drawing Figures

METHOD OF APPLYING A DYE IMAGE TO A PLASTIC MEMBER AND THE IMAGE BEARING MEMBER THEREBY FORMED

This application is a continuation of application Ser. No. 584,818, filed Feb. 28, 1984, now abandoned which in turn is a divisional of application Ser. No. 377,666, filed May 12, 1982, now abandoned.

BACKGROUND AND SUMMARY OF THE INVENTION

The instant invention relates to the transfer of images into plastic and more particularly to a method of applying a desired image of disperse dye to a plastic member.

While the technology relating to various types of plastic materials has developed greatly in recent years, the art relating to the application of colored images to plastic materials has remained somewhat undeveloped. In particular, the heretofore known art has failed to provide an economical method of applying images of high durability and resolution to plastic members. Methods wherein images are printed utilizing various techniques including screen printing have proven to be effective in many applications where image durability is not a primary concern. However, when conventional printed images are exposed to solvents or other corrosive environments, or when they are subjected to substantial frictional wear, they are unsatisfactory.

Sublimation printing wherein dyes are heated to their sublimation points to effect the transfer thereof to plastic members is also a widely known method of applying images to plastic members, although images produced by this method generally have poor resolution qualities. Such images also have poor thermal stability and poor resistance to solvents and other corrosive agents.

For applications where thermal stability, resistance to corrosion and wear, and high resolution are critical, it has heretofore been necessary to form images in two step molding processes. In a first step, a character image is separately molded in a desired configuration. Thereafter, the character is positioned in desired orientation in a second mold and the remainder of the member is molded around the character. Unfortunately, this method is extremely expensive and therefore has been used only where high resolution and durability are essential.

The instant invention relates to a novel and economical method of applying images of high resolution and durability to plastic members. Images formed by the method of the instant invention are not merely surface images but are actually diffused into the plastic of a member. This makes them durable and resistant to both wear and corrosion. In addition images formed by the method of the subject invention possess high qualities of resolution, light fastness and thermal stability. The method of the instant invention is also effective for forming high quality images having multiple colors in a single step. The method is comparatively simple and economical and hence has substantial advantages over the prior art methods.

In the first step of the method of the instant invention, an image of disperse dye is applied to the surface of a plastic member in a desired configuration. In the preferred method, this is effected by applying the dye to a paper sheet in the desired image, or more accurately, the mirror image thereof and then overlaying the paper sheet on the plastic member so that the dye image is in the desired orientation thereon and in intimate contact with a surface thereof. The dye is then diffused into the plastic of the member in accordance with the hereinafter described steps. It should be brought out, however, that only certain dyes can be effectively diffused into plastic in accordance herewith. Dyes which are suitable for the method of the subject invention generally comprise disperse dyes having melting temperatures which are below the respective thermal deflection temperatures of the plastic of the members to which they are to be applied and vaporization temperatures which are above said thermal deflection temperatures.

In the second step of the method, the dye and at least the portion of the plastic member which is adjacent thereto are heated to a temperature which is above the melting point of the dye but below the thermal deflection temperature of the plastic although high enough to cause at least some surface softening of said plastic. Thereafter, the dye is allowed to diffuse into the plastic to impart the desired dye image thereto. This provides a sharp, clear image which is resistant to solvents and the like, possesses high wear resistance qualities and possesses high qualities of thermal fixation and light fastness. Hence, the method of the instant invention is effective for making image bearing plastic members of very high quality. The method is also simple and economical and therefore has substantial advantages over the methods of the prior art.

For these reasons, it is a primary object of the instant invention to provide an economical method of applying high quality images to plastic members and the like.

Another object of the instant invention is to provide a method of applying high quality dye images to plastic members.

A still further object of the instant invention is to provide a method of applying dye images to plastic members and the like so that the images thereby formed exhibit qualities of high resolution, high resistance to wear and solvents, high light fastness, and high thermal fixation.

Other objects, features and advantages of the invention shall become apparent as the description thereof proceeds when considered in connection with the accompanying illustrative drawing.

BRIEF DESCRIPTION OF THE DRAWING

In the drawing which illustrates the best mode presently contemplated for carrying out the present invention.

DESCRIPTION OF THE INVENTION

Figure 1:
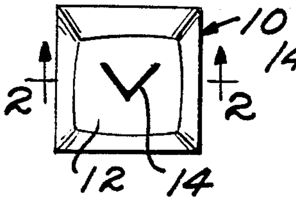
Fig. 1. PRIOR ART
FIG. 1 is a top plan view of an image bearing plastic member as formed by one of the methods of the prior art.
Figure 2:
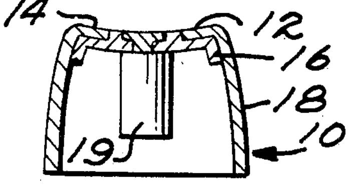
Fig. 2. PRIOR ART
FIG. 2 is an enlarged side sectional view thereof taken along line 2–2 in FIG. 1.
Figure 3:
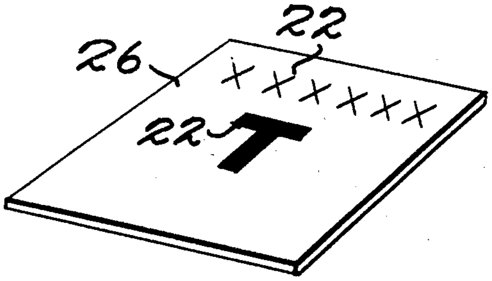
FIG. 3 is a perspective view of a sheet used in carrying out the instant invention having a dye image thereon.
Figure 4:
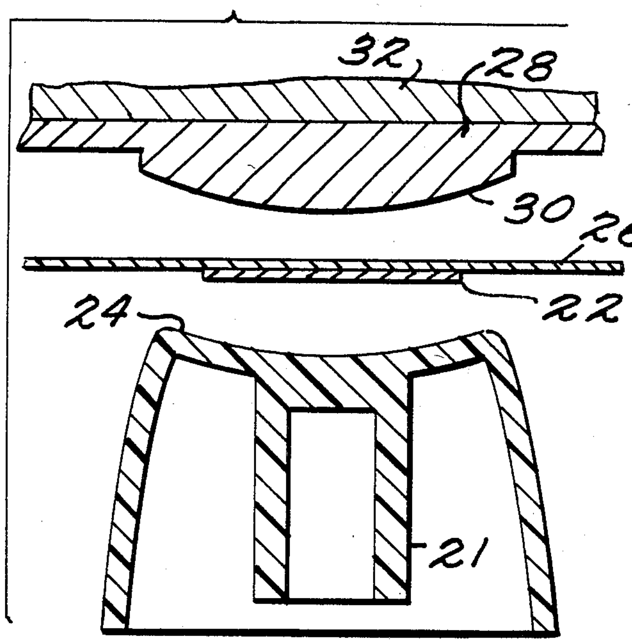
FIG. 4 is an enlarged exploded side sectional view illustrating the overlaying of the sheet with the dye thereon on a plastic member.

Referring now to the drawing, particularly FIGS. 1 and 2, an image bearing plastic member formed by a method of the prior art and embodied as a key of the type frequently used in typewriter and computer keyboard applications is indicated generally at 10. The key 10 has a concave upper surface 12 with an image 14 thereon and comprises an image portion 16 and a key portion 18 which includes a mounting socket 19. In accordance with the heretofore known method, the image and key portions 16 and 18, respectively, are formed separately in costly molding steps. In particular, the key 10 is made by first forming the image portion 16 which embodies the image 14 in an initial separate molding step. The image portion 16 is then positioned in desired orientation in a second mold and the key portion 18 is molded therearound to provide the key 10 with the desired image 14 thereon. This has proven to be a costly and time consuming method but has nevertheless been necessary where images of high durability and resolution have been required. For instance, it has heretofore proven necessary to form keys by this method for keyboards of the type used in the computer industry where character resolution and durability are of primary concern.

Referring further to the drawing, the method of the instant invention is illustrated in FIGS. 3 through 6. As herein illustrated and described, the method of the instant invention is used in the application of an image to to a plastic member 20 which may be a key of the type used in computer and typewriter keyboard applications which includes a mounting socket 21. It is understood, however, that the method of the instant invention is generally effective for the application of disperse dye images of high quality and resolution to a variety of types of plastic members having various surface configurations.

In the first step of the method of the instant invention, a disperse dye 22 is applied to a concave surface 24 of the plastic member 20 in the configuration of a desired image. In this connection, the disperse dye utilized in the method must have a melting point which is below the thermal deflection temperature of the plastic and a vaporization point which is above the thermal deflection temperature of said plastic. Accordingly, as herein illustrated and described, the dye 22 must comprise a dye selected from the group of disperse dyes having melting points and vaporization points which appropriately correspond to the thermal deflection temperature of the plastic of the member 20. It has been found preferable in most instances to apply the dye 22 to the surface 24 in a thickness of between 12 and 20 microns to form clear, distinct, durable dye images although dye applications of other thickness are contemplated. It has also been found to be preferable in most instances for the dye to be formulated with a conventional inorganic printing ink binder to improve its printing qualities. In the preferred method, the dye 22 is applied to the surface 24 in the manner illustrated in FIGS. 3, 4 and 5. In particular, the dye 22 is first applied to a sheet 26 in the desired image or actually the mirror image thereof, utilizing screen printing or some other known technique. For purposes of illustration, in FIG. 3 the dye 22 is clearly visible on the sheet 26. However, in actual practice many of the disperse dyes utilized in the subject invention are colorless even when formulated with binders and hence are invisible until they have been exposed to elevated temperatures whereupon the coloration thereof is permanently activated. Subsequent to the application of the dye 22 to the sheet 26, the sheet 26 is overlaid on the surface 24 so that the dye 22 is in intimate contact therewith. In the preferred method, proper contact of the dye 22 with the surface 24 is assured in the manner illustrated in FIG. 5 utilizing a printing element 28 having a surface 30 thereon which is substantially complementary to the surface 24. The element 28 is preferably made of an elastomeric material which is at least slightly resilient, and it is mounted on a heated print head 32. Desired contact of the dye 22 with the surface 24 is achieved by the application of downward force to the element 28 with the print head 32 so that the sheet 26 is "sandwiched" in slightly pressurized engagement between the surfaces 24 and 30 with the image defined by the ink 22 disposed in desired orientation on the surface 24. In this regard, pressures in the range of 1–2 psi between the sheet 26 and the surface 24 are preferable. It has been found that slightly pressurized contact of the sheet 26 and the dye 22 thereon with the surface 24 is particularly preferable, when, as herein embodied, the surface 24 is of nonplanar configuration. It is understood, however, that when applying dyes to surfaces having configurations other than that of the surface 24, the use of other methods of applying pressure to sheets bearing negative dye images to achieve the desired dye-surface contact is contemplated.

The sheet 26 preferably comprises a paper sheet which is at least slightly flexible. Further, it is preferable, particularly for applications of the type herein described wherein the surface 24 is of nonplanar configuration, that the sheet 26 be deformable to the configuration of the surface on which it is overlaid in order to achieve precise registration of the desired image thereon. For this reason, it is preferable for the sheet 26 to include approximately 5 percent of a thermoset polymer intermixed with the paper pulp thereof. Sixty to eighty pound offset sheet with 5 percent thermoset polymer has proven to be effective in this regard. When the thermoset polymer is melted as heat is applied to the sheet 26 during subsequent steps of the method which will hereinafter be described, the sheet 26 is permanently deformed to the configuration of the surface 24 to provide accurate registration of the desired image thereon. Since it is necessary that the sheet 26 be in precise registration before the dye 22 is melted during the subsequent steps, it is essential that the thermoset polymer have a melting point which is below that of the respective dye 22 being applied so that deformation of the sheet 26 occurs before the transfer of the dye 22 commences.

To further assure proper registration of the desired image on the surface 24, it has also been found to be preferable for the sheet 26 to include a coating of "cross linked" polymer on the surface thereof to which the dye 22 is to be applied in order to stabilize the sheet 26 against humidity effects prior to the actual use thereof in the application of dyes as herein described. In this connection, it is preferable that the polymer coating be "cross linked" so that it has relatively neutral characteristics and does not possess significant "memory" qualities and therefore does not shrink when heated. Uvimer 2-003 Clear Coat (T.M.) which is produced by the Polychrome Corporation has been found to be an effective coating. Uvimer 2-003 Clear Coat is normally used in other applications because it exhibits ultraviolet reactive qualities. However, in this instance, it is not used for its ultraviolet qualities but because it is a "cross linked" polymer and therefore does not exhibit "memory" characteristics which would cause shrinkage upon the application of heat thereto. It is understood, however, that the use of other stabilizing coatings, as well as the use of the sheet 26 without such coatings, is contemplated.

Subsequent to the application of the dye 22 to the surface 24, the dye 22 is actually diffused into the plastic of the member 20 adjacent to the surface 24 to permanently impart the desired dye 22 image to the member 20. This is accomplished by heating the dye 22 and the portion of the plastic member 20 adjacent thereto to a temperature which is above the melting point of the dye but below the vaporization temperature thereof, and which is sufficient to cause at least some surface softening of the plastic of the member 20 but which is nevertheless below the thermal deflection temperature of said plastic. In order to meet these limitations, the dye must, as hereinabove described, have a melting point which is below the thermal deflection temperature of the plastic of the member 20 and a vaporization temperature which is above said thermal deflection temperature. When the dye 22 and the adjacent portions of the plastic member 20 are heated to an appropriate temperature, the dye 22 is melted and diffused into the adjacent softened portions of the plastic member 20 whereby the desired image is imparted thereto. It is important, however, that when the dye 22 is formulated with a printing binder, that the binder have a melting point which is above that of the plastic of the member 20 so that the dye alone can be diffused into the plastic leaving the binder behind.

Figure 5:
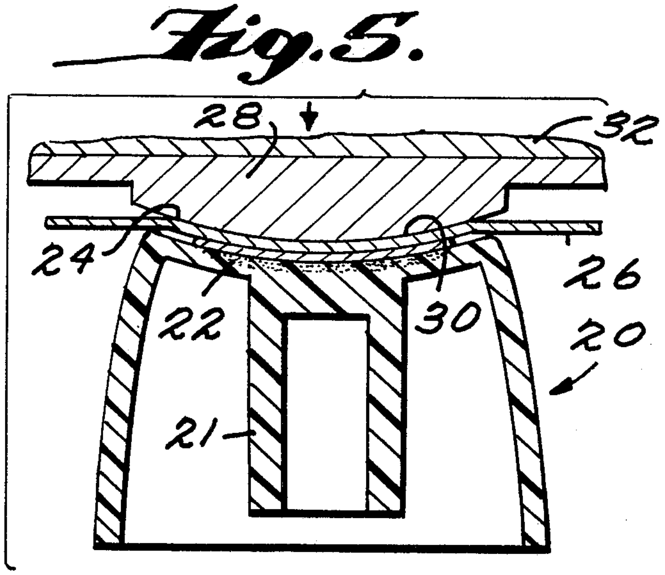
FIG. 5 is an enlarged sectional view illustrating the pressurized heating of the sheet, the dye and the plastic member to effect the diffusion of the dye.

Referring to FIG. 5, in the preferred method herein described, heat is applied to the sheet 26, the dye 22, and the plastic member 20 by means of the print head 32 and the printing element 28. In particular, when the printing element 28 is moved into pressurized engagement with the sheet 26, heat is transferred therefrom to the sheet 26, the dye 22 and the plastic member 20. As the temperature of the sheet 26 is raised by the heating thereof, the thermoset polymer intermixed with the paper fibers melts causing the sheet 26 to be permanently deformed to the configuration of the surface 24. Since the melting point of the thermoset polymer is below that of the dye 22, complete deformation of the sheet 26 is effected before the ink 22 commences to melt and hence precise registration of the desired dye image is achieved before diffusion transfer of the dye 22 commences. As the temperature of the dye 22 and the adjacent portions of the member 20 is raised further, the dye 22 is melted to a liquid state making it suitable for diffusion into the plastic of the member 20. Also, the plastic of the member 20 in the areas thereof adjacent to the surface 24 is heated to a temperature where it is slightly softened although not melted. This has the effect of increasing the receptivity of the plastic to the dye 22. Preferably only about the upper 3-6 mils of the plastic of the member 20 are softened although softening thereof to other degrees is contemplated in the method of the instant invention.

In the final step of the method, the melted dye 22 is allowed to diffuse into the softened areas of the plastic to impart the desired image thereto. This normally requires only a few seconds, although the precise time depends on the physical characteristics of the particular dye and the particular plastic. However, because the dye is melted rather than vaporized and because the plastic of the member 20 is softened only slightly, the final image may be produced with sharp, clear and durable qualities.

Figure 6:
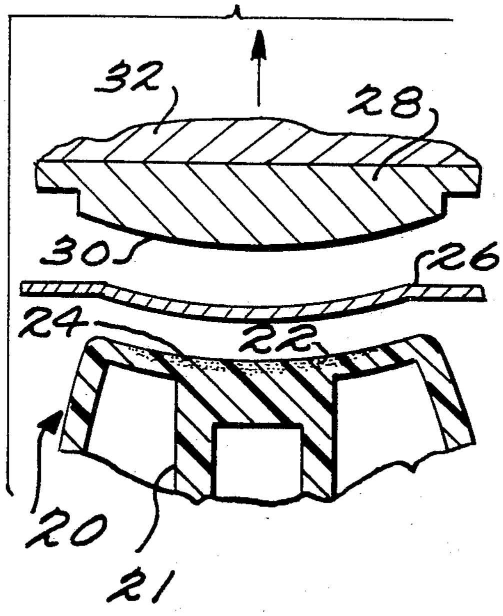
FIG. 6 is an enlarged exploded side sectional view illustrating the removal of the sheet from the plastic member after the dye has been diffused therein.
Figure 7:
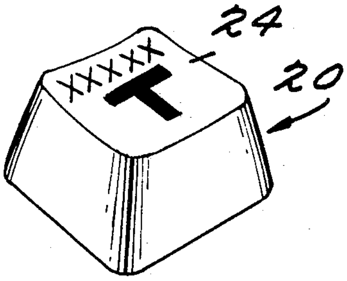
FIG. 7 is a perspective view of a plastic member bearing an image formed in accordance with the instant invention.

As illustrated in FIG. 6, after the dye 22 has diffused into the plastic member 20, the print head 32 is raised and the sheet 26 is removed from the surface 24 leaving the dye 22 fully diffused in the plastic member 20.

As hereinabove noted, the method of the instant invention is effective for applying images to a variety of types of plastic members. It has been found, however, that predominantly crystalline polymer plastics are the most receptive to dye images applied in accordance herewith. In particular, polyester and polycarbonate plastics are highly receptive to disperse dyes and hence these plastic materials are preferable. In this regard, Valox 311 (T.M.) and Valox 325 (T.M.) manufactured by General Electric have proven to be receptive to dyes applied in accordance herewith.

While the method of the subject invention can be effectively practiced with generally any disperse dyes within the limitations hereinabove set forth, some qualities make the use of particular dyes preferable for producing images of high resolution and durability. In this connection, light fastness (stability under exposure to ultraviolet light) thermal creep fixation (stability under exposure to prolonged periods of elevated temperatures) and color build up (rapid diffusion qualities into plastic) are desirable qualities which are exhibited by particular disperse dyes. In general organic dyes have proven to be effective in the method of the instant invention. In particular, many azo dyes, monazo dyes, pyrazolopyridine dyes and anthraquinone dyes have proven to be effective for producing sharp and durable images in a variety of color ranges. Dyes of these types having a methoxy group, a nitrile group, a nitro group, or a chlorine atom have been found to exhibit high qualities, and dyes of these types having a cyano group and an acetoxy group or two cyano groups have been found to exhibit exceptionally high qualities. Anthraquinone dyes having sulfonamide groups, chloro groups, methylmercapto groups, oxygen ether groups, or sulpher ether groups also have proven to be effective and exhibit superior qualities in the subject invention. Dyes of the abovementioned types having molecular weights in the range of 380 to 625, melting points greater than 290° F. and vaporization points greater than 390° F. are generally preferable in most instances because the melting points and vaporization points thereof properly correspond to the thermal deflection temperatures of most commonly used plastics, particularly the polyester and polycarbonate plastics hereinabove mentioned. The dyes included in the following list have generally been found to be effective in the subject invention.

C.I. Disperse Yellow 42
C.I. Disperse Yellow 67
C.I. Disperse Red 53
C.I. Disperse Red 55
C.I. Disperse Red 72
C.I. Disperse Red 94
C.I. Disperse Red 92
C.I. Disperse Red 177
C.I. Disperse Red 192
C.I. Disperse Red 199
C.I. Disperse Blue 20
C.I. Disperse Blue 26

C.I. Disperse Blue 27
C.I. Disperse Blue 40
C.I. Disperse Blue 55
C.I. Disperse Blue 60
C.I. Disperse Blue 62

It is seen therefore that the method of the instant invention is effective for applying durable disperse dye images of high resolution to various plastic members. Dye images formed in accordance with the subject method are of substantially higher quality than dye images formed by the heretofore known printing methods such as sublimation printing. Therefore, they have proven to be effective in a substantially expanded range of applications. In particular, plastic members bearing disperse dye images formed in accordance herewith have been found to possess sufficient quality to replace image bearing plastic members formed by the heretofore known two-step molding techniques hereinabove described in most instances. Consequently, the method of the subject invention provides significant economic benefits because of the substantial reductions in cost provided in the production of high quality dye images; and, as a result, the method of the instant invention represents a substantial improvement in the art which has significant commercial merit.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A plastic member having applied on a surface thereof a desired image, said image being the melt of a disperse dye diffused into said surface and into the adjacent portions of said plastic member therebeneath, said disperse dye having a melting point below the thermal deflection temperature of said plastic member and a vaporization temperature which is above said thermal deflection temperature and said disperse dye being selected from the group consisting of an azo dye, a pyrazolopyridine dye and an anthraquinone dye, said dye being substituted by at least one of a methoxy group, a nitrile group, a nitro group or a chlorine atom and being further substituted by (i) a cyano group and an acetoxy group or (ii) by two cyano groups.

2. The plastic member of claim 1 wherein said disperse dye has a molecular weight ranging from 380 to 625 and has a melting point greater than 290° F. and a vaporization point greater than 390° F.

3. A plastic member having applied on a surface thereof a desired image, said image being the melt of a disperse dye diffused into said surface and into the adjacent portions of said plastic member therebeneath, said disperse dye having a melting point below the thermal deflection temperature of said plastic member and a vaporization temperature which is above said thermal deflection temperature, said disperse dye being an anthraguinone dye substituted by at least one of a sulfonamide group, a chloro group, a methlmercapto group, an oxygen ether group or a sulfur ether group and said disperse dye having a molecular weight ranging from 380 to 625 and having a melting point greater than 290° F. and a vaporization point greater than 390° F.

4. A plastic key member having applied on a surface thereof a desired image, said image being the melt of a disperse dye diffused into said surface and into the adjacent portions of said plastic key member therebeneath, said disperse dye having a melting point below the thermal deflection temperature of said plastic key member and a vaporization temperature which is above said thermal deflection temperature, said disperse dye being selected from the group consisting of C.I. Disperse Yellow 42, C.I. Disperse Yellow 67, C.I. Disperse Red 53, C.I. Disperse Red 55, C.I. Disperse Red 72, C.I Disperse Red 94, C.I. Disperse Red 92, C.I. Disperse Red 177, C.I. Disperse Red 192, C.I. Disperse Red 199, C.I. Disperse Blue 20, C.I. Disperse Blue 26, C.I. Disperse Blue 27, C.I. Disperse Blue 40, C.I. Disperse Blue 55, C.I. Disperse Blue 60 and C.I. Disperse Blue 62.

5. The plastic key member of claim 4 wherein the plastic is a predominantly crystalline polyester or polycarbonate polymer.

* * * * *